United States Patent [19]
Boyer et al.

[11] Patent Number: 5,434,912
[45] Date of Patent: Jul. 18, 1995

[54] AUDIO PROCESSING SYSTEM FOR POINT-TO-POINT AND MULTIPOINT TELECONFERENCING

[75] Inventors: David G. Boyer, Tinton Falls, N.J.; Ali L. Jalali, The Woodlands, Tex.; Gennady Shtirmer, Morris Plains, N.J.

[73] Assignee: Bell Communications Research, Inc., Livingston, N.J.

[21] Appl. No.: 105,216

[22] Filed: Aug. 11, 1993

[51] Int. Cl.⁶ .................. H04M 3/56; H04M 1/20
[52] U.S. Cl. .................... 379/202; 379/390; 379/392; 379/406
[58] Field of Search ............. 379/53, 54, 158, 202, 379/203, 204, 205, 206, 388, 390, 392, 395, 406, 410

[56] References Cited

U.S. PATENT DOCUMENTS

| | | | |
|---|---|---|---|
| 3,183,304 | 5/1965 | Schroeder | 381/83 |
| 3,622,714 | 11/1971 | Berkeley et al. | 379/399 |
| 3,973,086 | 8/1976 | May, Jr. | 379/406 |
| 4,008,376 | 2/1977 | Flannagan et al. | 379/206 |
| 4,029,912 | 6/1977 | Geigel et al. | 379/406 |
| 4,253,000 | 2/1981 | Kasson | 379/202 |
| 4,644,108 | 2/1987 | Crouse et al. | 379/406 |
| 4,670,903 | 6/1987 | Araseki et al. | 379/411 |
| 4,748,663 | 5/1988 | Phillips et al. | 379/388 |
| 4,890,314 | 12/1989 | Judd et al. | 379/53 |
| 4,982,425 | 1/1991 | Yoshida | 379/390 |
| 4,991,166 | 2/1991 | Julstrom | 370/32.1 |
| 4,991,167 | 2/1991 | Petri et al. | 370/32.1 |
| 5,029,162 | 7/1991 | Epps | 370/77 |
| 5,271,057 | 12/1993 | Addeo et al. | 379/390 X |

OTHER PUBLICATIONS

"Improving Audio Quality: Echo Control in Videoconferencing," G. Hill, Teleconference, Mar.–Apr. 1991, vol. 10, No. 2, pp. 29–43.

"High Quality Hands–Free Telephony Using Voice Switching Optimised with Echo Cancellation," W. Armbruster, Signal Processing IV, 1988, J. L. Lacoume et al. (eds.), Elsevier Science Publishers, B.V., pp. 495–498.

"Some Aspects of Stereophony Applicable to Conference Use," F. K. Harvey et al., Journal Audio Engineering Society, Jul. 1963, vol. 11, pp. 212–217.

Primary Examiner—James L. Dwyer
Assistant Examiner—Harry S. Hong
Attorney, Agent, or Firm—Leonard Charles Suchyta; Loria B. Yeadon

[57] ABSTRACT

Our audio processing system for use in teleconferencing systems includes a microphone, receiver, and substantially the same comb filter and frequency scaler at each station for reducing acoustic echo and increasing the margin of acoustic stability. The comb filters and frequency scalers cooperate with one another in that the frequency scalers each induces a shift in frequency which corresponds to the peak-to-trough spacing of the transfer function of the comb filters. Our audio processing system may also include auxiliary echo suppressors for reducing acoustic echo and increasing the margin of acoustic stability in systems having high and low transmission delays. Other devices may be employed for reducing noise and smoothing out the operation of individual components in the system. Since the comb filters employed at each station are not complementary, but are substantially the same, our audio processing system can mitigate the effects of acoustic instability and echo in point-to-point and multipoint audio processing systems. Furthermore, since each station utilizes substantially the same equipment, the need for equipment negotiation between stations and equipment changes prior to a conferencing session is obviated.

15 Claims, 12 Drawing Sheets

AUDIO PROCESSING SYSTEM FOR POINT-TO-POINT AND MULTIPOINT TELECONFERENCING

RELATED APPLICATIONS

Application Ser. No. 07/774,085, entitled "Audio Processing System for Teleconferencing System," filed on Oct. 9, 1991, by E. Addeo, J. Desmarais, and G. Shtirmer, now U.S. Pat. No. 5,271,057, which issued on Dec. 14, 1993, and Application Ser. No. 08/008,965 entitled "Audio Processing System for Teleconferencing System Having High and Low Transmission Delays," filed on Jan. 26, 1993, by E. Addeo, J. Desmarais, and G. Shtirmer, now allowed both of which are assigned to the assignee hereof contain subject matter related to that of the present application and are hereby incorporated by reference.

FIELD OF THE INVENTION

Our invention relates to a teleconferencing system. Specifically, our invention relates to an audio processing system for use in a teleconferencing system.

BACKGROUND OF THE INVENTION

A teleconferencing system comprises N remotely located stations, for $N \geq 2$, which stations are interconnected by a transmission system. Teleconference participants located at the remote stations are in audio and video communication with one other another. To accomplish the audio and video communication, each station includes a microphone for generating an audio signal for transmission to the other station(s), a receiver for receiving an audio signal from the other station(s), a video camera for generating a video signal for transmission to the other station(s) and a display apparatus for displaying a video signal generated at the other station(s). Each station also includes a codec for coding the video signal generated at the station for transmission in a compressed fashion to the other station(s) and for decoding a coded video signal received from the other station(s). A point-to-point teleconferencing system comprising a station from the prior art is shown in FIG. 1. A multipoint teleconferencing system serving $N > 2$ stations from the prior art would be similarly configured with additional stations.

The present invention relates to the audio processing portion of the teleconferencing system. The audio processing portion may be viewed as comprising a first microphone and a first receiver located at a first station and a second microphone and a second receiver located at a second station, and for systems having $N > 2$ stations, a third microphone and a third receiver located at a third station, and an N-th microphone and an N-th receiver located at an N-th station.

In a point-to-point system for conferencing between the first station and second station, a first channel is established in a transmission system for transmitting an audio signal from the first microphone at the first station to the second receiver at the second station. A second channel is established in the transmission system for transmitting an audio signal from the second microphone at the second station to the first receiver at the first station.

In a multipoint system in which there is a conference between N stations, for $N > 2$, a central bridge with N input ports and N output ports is used to receive signals from and send signals to other stations. The function of the bridge is to detect, select, route, and mix signals with speech activity to each of the participating stations, and terminate all other incoming signals. Some bridges limit the maximum number of stations which can simultaneously transmit signals to other stations to $K \leq N$.

In the multipoint system, channels are established between each station and each other participating station. Specifically, a channel is established in a transmission system for transmitting an audio signal from the first microphone at the first station to the first input port of the bridge to the receiver of each participating station via its corresponding output port of the audio bridge. In addition, a channel is established for transmitting an audio signal from the microphone of each other station via its corresponding input port of the bridge to the first receiver at the first station via the first output port of the audio bridge. Similar transmission channels are established with respect to the remaining N-1 stations.

A problem with most point-to-point and multipoint audio processing systems is acoustic coupling between the microphone and the receiver at each station. In particular, in the point-to-point system, there is a round-trip feedback loop which, for example, is formed by: 1) the microphone at the first station, 2) the channel connecting the first microphone to the second receiver at the second station, 3) the acoustic coupling path at the second station between the second receiver and the second microphone, 4) the channel connecting the second microphone at the second station and the first receiver at the first station, and 5) the acoustic coupling path at the first station between the first receiver and the first microphone. If at any time, the net loop gain is greater than unity, the loop becomes unstable and may oscillate. The result of this instability is the well-known "howling" sound. In such loops, even when the overall gain is low, there is still the problem of acoustic echo, which stems from a speaker's voice returning to his ear, at a reduced but audible level, after traveling around the loop. The acoustic echo problem worsens in teleconferencing systems as the transmission delay increases. Incompletely suppressed echoes which are not distinguishable to a teleconference participant at short transmission delays, become more distinguishable with longer transmission delays.

In the multipoint system, the same problems of acoustic feedback stability and echo are present in channels connecting all pairs of channels. But an additional problem arises in the multipoint case. Here, any number of stations could be selected by the audio bridge as being active. All stations could be selected as being active simultaneously, thus making feedback stability between all station even more difficult. In the multipoint system, achieving feedback stability between a pair of stations may not result in feedback stability between other pairs of stations in the system.

A variety of solutions have been proposed in the prior art for the problems of acoustic instability and acoustic echoes (see. e.g., G. Hill, "Improving Audio Quality Echo Control in Video Conferencing", Teleconference, Vol. 10, No. 2, March–April 1991; and W. Armbruster, "High Quality Hands-Free Telephony Using Voice Switching Optimized With Echo Cancellation", Signal Processing IV, J. L. Lacoume, et al, editors, Elsevier Science Publishers, B.V., 1988, pp. 495–498).

One approach to solving the echo problem in the audio processing loop of a teleconferencing system is to use an echo canceller. An echo canceller is a circuit which produces a synthetic replica of an actual echo contained in an incoming signal. The synthetic replica is subtracted from the incoming signal to cancel out the actual echo contained in the incoming signal. The echo canceller may be implemented by an adaptive transversal filter whose tap values are continuously updated using, for example, a least mean square algorithm to mimic the transfer function of the actual echo path.

This type of echo canceller suffers from a number of disadvantages. First, the echo canceller is computationally complex, i.e., it requires the use of a significant number of specialized Digital Signal Processors for implementation. Second, for wideband speech (7 kHz), in rooms with a large reverberation time, the echo canceller requires a long transversal filter with about 4000 or more taps. Such long filters have a low convergence rate and poorly track the transfer function of the actual echo path. In addition, some echo cancellers implemented using an adaptive transversal filter must be trained with a white noise training sequence at the beginning of each teleconference. If abrupt changes in the acoustics of the conference room are introduced, echo may not be properly cancelled resulting in loud echos and possible acoustic instability. In that case, the system must be reset and retraining will be required during the teleconference.

Another technique for solving the problem of acoustic echo and instability is to place an echo suppressor at the output of the microphone at each teleconferencing station. Typically, the echo suppressor comprises a level activated switch which controls a gate and a variable attenuation device. When the signal level at the output of a microphone is below a threshold level, or when the incoming far-end signal is stronger than the signal at the output of the microphone by at least 6 dB, a gate is closed to block the communication channel leading away from the microphone. When the signal level at the output of the microphone is below a threshold level and when the incoming far-end signal is not stronger than the signal at the output of the microphone by at least 6 dB, the gate is open to place the communication channel leading away from the microphone into a pass state. Illustratively, the threshold level of the echo suppressor may be set to the maximum level of the ambient noise. For this system, when one teleconference participant is talking, his local echo suppressor opens the local gate so that the channel to the remote station is open. If the other teleconference participant at the remote station is not talking, the echo suppressor at the remote station closes the gate at the remote station so that the echo return path is blocked. Some echo suppressors open or close the gate to the communication channel by detecting the presence or absence of local speech rather than by simply determining if a microphone output signal is above or below a threshold.

When the participants at both ends of the teleconference try to speak at the same time, a condition known as double talk exists. Under the double talk condition, the echo suppressor gates at both ends of the teleconference are open, and there is the possibility of acoustic echo being returned to both participants as well as the possibility of acoustic instability. During double talk, the echo is not a serious problem since it is masked by the local speech. However, an additional variable attenuation device can be employed which introduces the amount of attenuation necessary to ensure acoustic feedback stability. Thus, acoustic stability is achieved, but the audio signal carrying the speech of the teleconference participants is attenuated. In many cases, the amount of attenuation which has to be introduced at the output of each microphone for echo suppressor may be too great to maintain fully interactive two-way communication between participants. Thus, this type of echo suppressor is not entirely satisfactory for use in a teleconferencing system.

In addition to the use of echo suppressors and echo cancellers, frequency shifters or special filters may be utilized in the audio processing system of a teleconferencing system. For example, a frequency shifter may be utilized to increase the margin of acoustic stability (see, e.g., U.S. Pat. No. 3, 183,304, and F. K. Harvey et al., "Some Aspects of Stereophony Applicable to Conference Use", Journal Audio Engineering Society, Vol. 11, pp. 212–217, July 1963).

Alternatively, comb filters with complementary pass and stop bands may be placed in the two audio channels connecting the two stations of a teleconference (see, e.g, U.S. Pat. Nos. 3,622,714 and 4,991,167). The use of the complementary comb filters mitigates the effect of acoustic coupling between the receiver and microphone at each station. The reason is that any signal going around the feedback loop is processed by both comb filters and will be attenuated across its entire spectrum as the stop bands of the two comb filters are complementary. This improves the margin of acoustic stability to some extent and reduces acoustic echo. On the other hand, a speech signal which travels from one station to the other is only processed by one comb filter and is not attenuated appreciably across its entire spectrum. In comparison to echo cancellers, comb filters have the advantage of simplicity. However, comb filters introduce some degradation in perceived speech quality. The reason for the degradation is that practically half of the spectrum of the signal is filtered out at the comb filters. To reduce the perceived degradation in quality, the band transitions of the comb filter transfer functions are made smoother. Smoother band transitions reduce the margin of acoustic stability otherwise achievable with sharper band transitions. To provide additional margin of acoustic stability, a frequency scaler could be used anywhere in the audio chain as explained below.

In related Application Ser. No. 07/774,085, entitled "Audio Processing System for Teleconferencing System," filed on Oct. 9, 1991, by E. Addeo, J. Desmarais, and G. Shtirmer, now allowed, and Application Ser. No. 08/008,965 entitled "Audio Processing System for Teleconferencing System Having High and Low Transmission Delays," filed Jan. 26, 1993, by E. Addeo, J. Desmarais, and G. Shtirmer, the problems of acoustic instability and echo in a point-to-point system were addressed. These problems were addressed by employing, in the audio processing system, a first comb filter in the first channel connecting a first microphone at a first station to a second receiver at a second station, and a second comb filter, which is complementary to the first comb filter, in the second channel connecting a second microphone at the second station to a first receiver at the first station. In addition the audio processing system of these related applications employed a frequency scaler located in one of the channels for scaling by a constant factor the frequency spectrum of a signal in one channel.

The audio processing system of Application Ser. No. 07/774,085, also includes a first and second echo suppressor which activates the first and second comb filters, respectively. The audio processing system of Application Ser. No. 08/008,965 also includes first and second echo suppressors connected to first and second microphones for inserting a first and second variable attenuation in the first channel and second at the output of said first and second microphone, respectively. The first variable attenuation depends upon the intensity of said first signal transmitted from first microphone and the intensity of the second signal being received by the first receiver. Furthermore, the second variable attenuation, depends upon the intensity of the second signal transmitted from the second microphone and the intensity of the first signal being received by the second receiver.

A practical drawback of the audio processing systems of these related applications and other prior systems employing comb filters to mitigate effects of acoustic coupling is that complementary comb filters are employed. Therefore, in order for first and second stations to improve the margin of acoustic stability and reduce acoustic echo during a teleconference, the first station must have a comb filter which is complementary to the comb filter of the second station. Furthermore, since these systems employ complementary comb filters, in practice, each station must have available both types of filters, and during conference set-up, stations must negotiate to ensure that complementary comb filters are being used. This practical constraint results in extra components and complexity in the system and delay in conference set-up.

Another drawback of systems that employ complementary comb filters to increase the margin of acoustic stability and reduce acoustic echo is that such systems are not effective in multipoint teleconferencing systems. This drawback is best described with reference to the illustration shown in FIG. 2. FIG. 2 illustratively shows stations 1, 2, 3, and 4, And each station has an associated comb filter 5, 6, 7, and 8, respectively. Illustratively, comb filters 5 and 7 are complementary to comb filters 6 and 8. These stations are connected for teleconference via an audio bridge 75. As discussed above, upon detecting an active station, the audio bridge transmits the signal carrying speech from the active station to the other station in the system which are participating in the conference, and thus pairs the active station with each of the other participating stations. Therefore, if station 1 is detected by the audio bridge 75 as being active, the audio bridge 75 transmits the signal carrying speech from station 1 to stations 2, 3, and 4. If stations 2, 3, and 4, each responds, thereby becoming active, the audio bridge will transmit those signals carrying speech to station 1 as well as the other stations. Therefore, the roundtrip between station 1 and each of the other stations is subject to acoustic instability and echo where there is coupling between the microphone and receiver at each station.

Transmission between stations 1 and 2 enjoys an increased margin of acoustic stability and reduced acoustic echo since comb filters 5 and 6 are complementary, and similarly for stations 1 and 4 since comb filters 5 and 8 are complementary. However, transmission between stations 1 and 3 is subject to unmitigated effects of acoustic instability and echo since comb tillers 5 and 7 are not complementary. Therefore, from this illustrative example, it is clear that arrangements employing complementary filters are not conducive combatting effects of acoustic instability and echo in multipoint systems since channels connecting each pair of stations via the audio bridge may not have complementary comb filters.

In view of the foregoing, it is an object of the present invention to provide an audio processing system which supports point-to-point and multipoint audio communications in a teleconferencing system, employs comb filters, and provides an increased margin of acoustic stability and reduced acoustic echo.

SUMMARY OF THE INVENTION

In accordance with an illustrative embodiment of the present invention, we disclose an audio processing system for processing audio signals in a teleconferencing system comprising N stations, for $N \geq 2$. Each station comprises a microphone, a receiver, a comb filter and a frequency scaler. Illustratively, the microphone is connected to the comb filter on a channel and the receiver is connected to the frequency scaler on a separate channel.

The comb filters at each station are substantially the same having substantially the same transfer function of alternating pass bands and stop bands as the comb filters at other stations in the system, contrary to prior schemes employing complementary comb filters. Each comb filter has a magnitude response with exponentially increasing band spacing and sinusoidal band transitions. The frequency scalers at each station are also substantially the same, inducing substantially the same shift in frequency.

Significantly, the comb filters and frequency scalers cooperate with one another. Specifically, a signal transmitted by a microphone at a station is filtered at a comb filter prior to being transmitted to another station. Prior to being received at a receiver of another station, the filtered signal is shifted in frequency by a frequency scaler, such that the peaks of the filtered signal are aligned with the stopbands of the comb filter. Therefore, the frequency scaler induces a shift in frequency of incoming signals corresponding to the peak-to-trough spacing of the comb filter. If the shifted signal is acoustically coupled from the receiver into the microphone, the system is subject to acoustic instability and echo. But, after being acoustically coupled into the microphone, the shifted signal is then substantially blocked by the comb filter connected to the microphone at the other station. Therefore, through this cooperation of the frequency scalers and the comb filters in the system, the margin of acoustic stability is increased and acoustic echo is reduced without requiring complementary comb filters in the channels of communicating stations, but instead, using substantially the same comb filter and frequency scaler at each station.

In a point-to-point system, a first microphone and a first receiver are located at a first station, and a second microphone and a second receiver are located at a second station. A first comb filter whose transfer function includes a set of alternating pass and stop bands is illustratively located in the transmission channel between the first microphone at the first station and the second receiver at the second station. A second comb filter which is substantially the same as the first comb filter is located in the transmission channel between the second microphone at the second station and the first receiver at the first station.

Another alternative illustrative embodiment for handling echoes and acoustic instabilities in large delay systems includes auxiliary echo suppressors in combination with comb filters and frequency scalers which cooperate as described above. In this embodiment, acoustic echo is reduced and the margin of acoustic stability is increased sufficiently to be suitable for both low and high delay transmission systems. An auxiliary echo suppressor is located at each station having a receiver and a microphone. The auxiliary echo suppressor inserts an attenuation at the output of a microphone based upon a comparison of the energy level of the signal output from the microphone and the energy level of the signal directed towards the receiver at the station.

In a further illustrative embodiment, a comb filter is located between the microphone and auxiliary echo suppressor at each station, and the comb filters between two teleconferencing stations are substantially the same. This illustrative embodiment also includes frequency scalers connected to the receiver at each station, which frequency scalers cooperate with the comb filters as described above. Placing the comb filters and frequency scalers as such helps the auxiliary echo suppressors distinguish between acoustically coupled versus locally generated speech, since the acoustically coupled speech will have been processed by both comb filters while the latter will have been processed by only one of the two comb filters.

In short, in accordance with the present invention, an audio processing system of a teleconferencing system is disclosed which utilizes comb filters in combination and cooperation with frequency scalers to reduce acoustic echo and increase the margin of acoustic stability.

The organization and operation of our invention will be better understood from a consideration of the detailed description of the illustrative embodiments thereof, which follow, when taken in conjunction with the accompanying drawing.

DETAILED DESCRIPTION OF THE INVENTION

Figure 1:
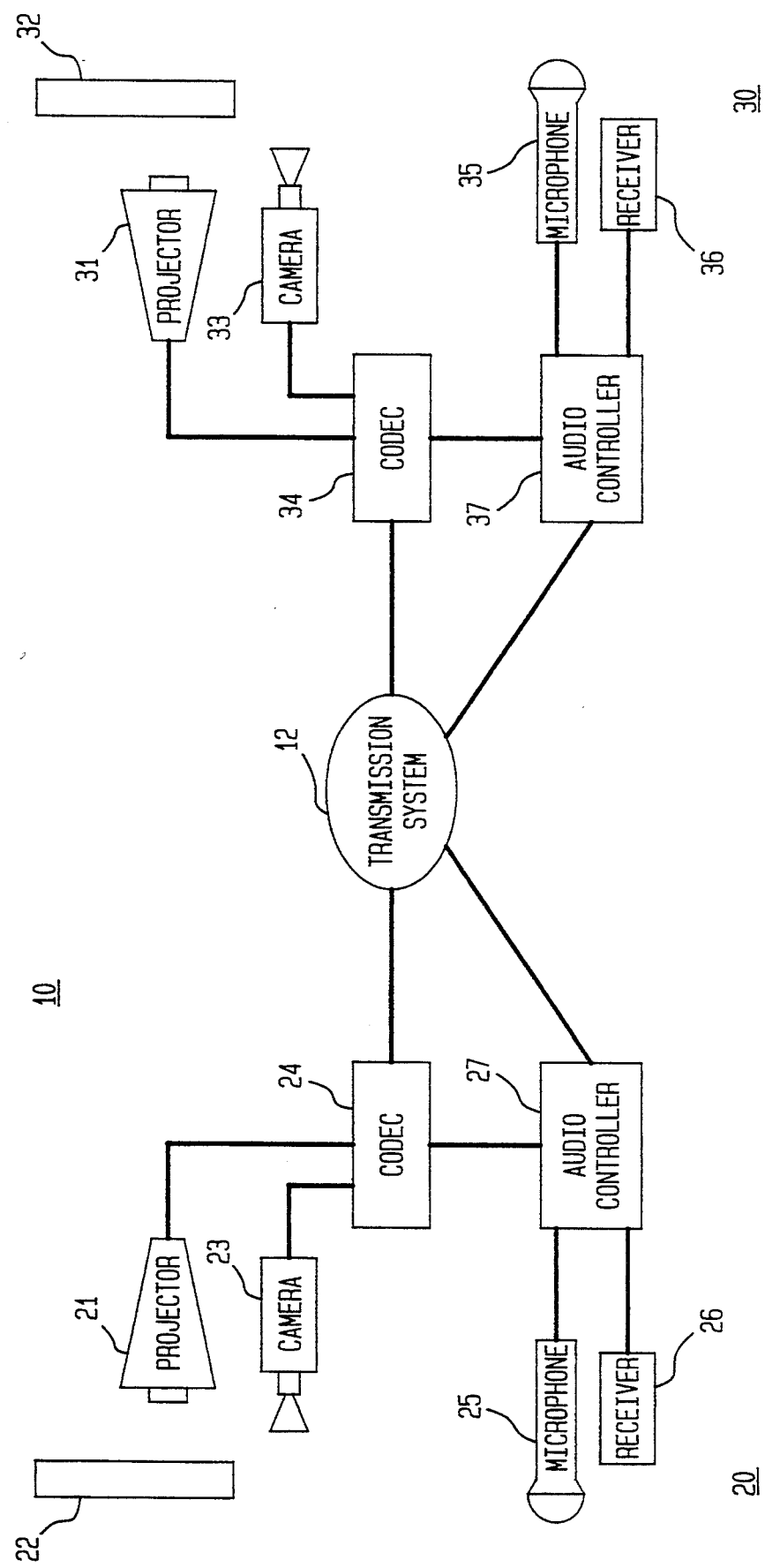
FIG. 1 depicts a point-to-point teleconferencing system between two teleconferencing stations from the prior art.
Figure 2:
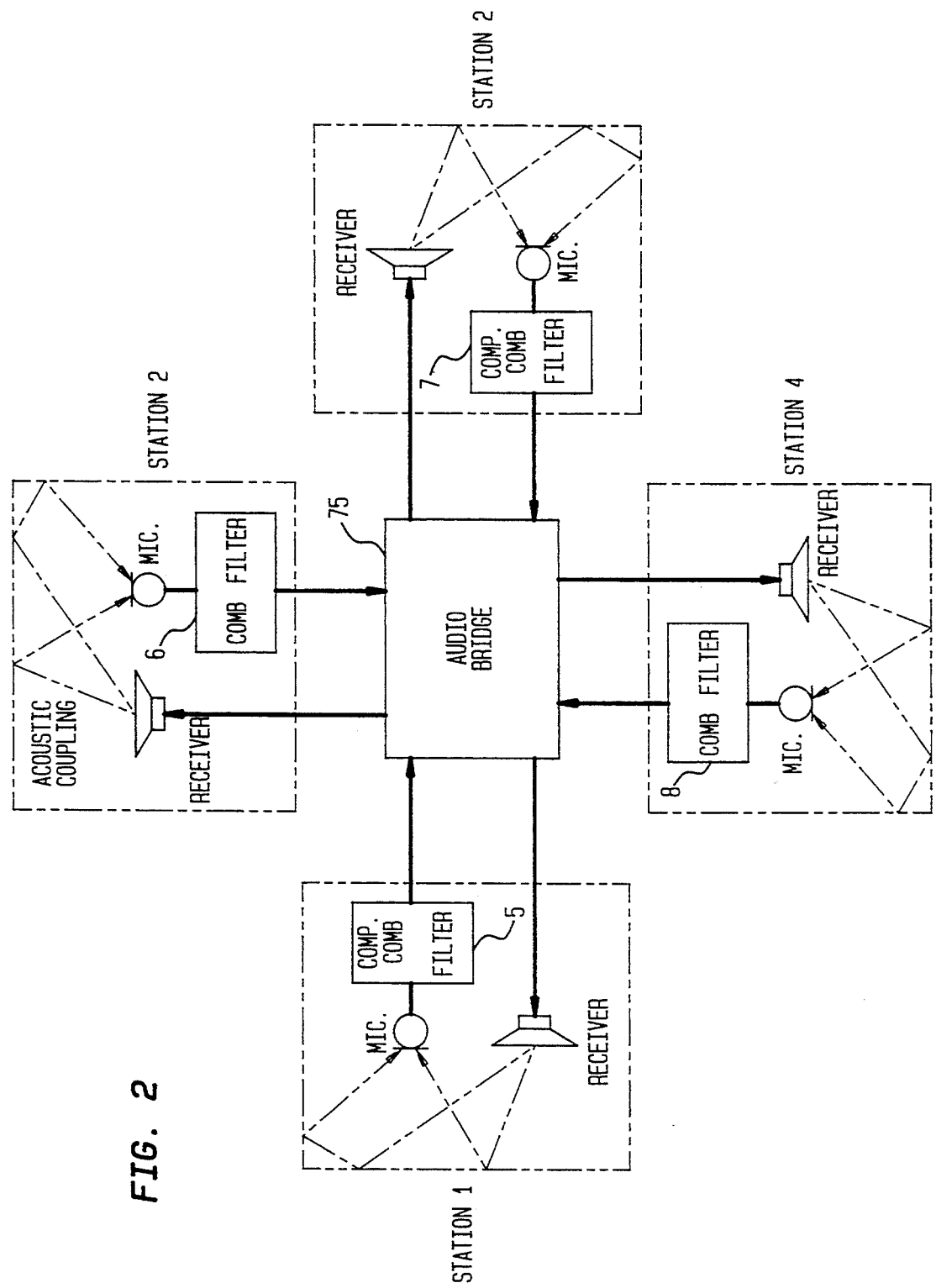
FIG. 2 depicts a multipoint audio conferencing system connecting four conferencing stations from the prior art employing complementary comb filters to illustrate the problems therein.

FIG. 1 illustrates a point-to-point teleconferencing system with audio and video communication capabilities. The conferencing system 10 of FIG. 1 comprises two stations 20 and 30 (N=2) which are remotely located from one another and interconnected by the transmission system 12. For video communications, the station 20 includes the projector 21 for displaying a video image on the screen 22, the video camera 23 and the codec 24. Similarly, the station 30 includes a projector 31 for displaying a video image on a screen 32, a video camera 33 and a codec 34. The camera 23 generates a video signal at the station 20. The video signal is coded for compression by the codec 24 and transmitted via the transmission system 12 to the station 30. For example, the transmission system 12 may offer transmission facilities operating at DS1 or DS3 transmission rates which are North American telephone network digital transmission rates at 1.5 and 45 megabits per second, respectively. At the station 30, the video signal is decoded by the codec 34 and converted into an image by the video projector 31 for display on the screen 32. In a similar manner, the camera 33 at the station 30 generates a video signal for display at the station 20 by the projector 21 on the screen 22.

A multipoint conferencing system with video communication capabilities would be similarly configured, but would employ more than two similarly equipped stations connected via transmission system 12.

For audio communications in a point-to-point conferencing system, as shown in FIG. 1, the station 20 includes the microphone 25, the receiver 26, and the audio controller 27. Similarly, the station 30 includes the microphone 35, the receiver 36, and the audio controller 37. To transmit speech from the station 20 to the station 30, the microphone 25 converts the speech into an audio signal. The audio controller 27 matches the processing delay of the audio signal to the processing delay introduced into video signal from the camera 23 by the codec 24. The audio controller 27 may also include one or more circuits for preventing acoustic instability and for reducing echoes. The audio signal is transmitted through the transmission system 12 to the station 30. At the station 30, the audio signal is processed by the audio controller 37 to match delays introduced by the decoding operation of the codec 34 for the corresponding video signal. The audio signal is then converted back to acoustic form by the receiver 36. A similar process is utilized to transmit speech from the microphone 35 of the station 30 to the receiver 26 of the station 20.

Figure 3:
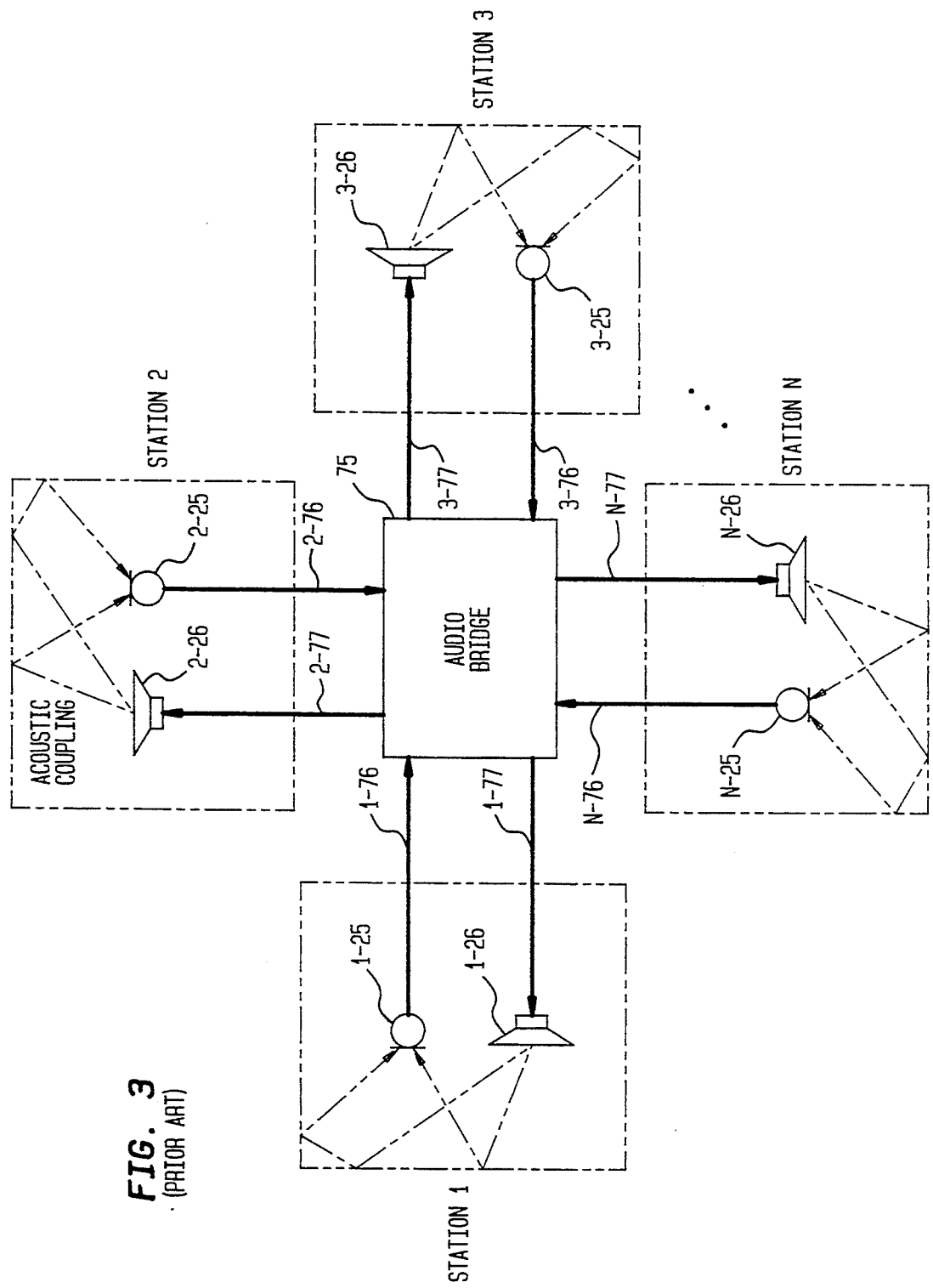
FIG. 3 depicts a multipoint audio processing system from the prior art.

For audio communications in a multipoint conferencing system, as shown in FIG. 3, each of the stations 1, 2, 3 . . . N similarly includes a microphone and a receiver. Specifically, station N includes microphone N-25 and receiver N-26. In addition, a central bridge 75 with input ports 1-76, 2-76, 3-76 . . . N-76 and output ports 1-77, 2-77, 3-77 . . . N-77 is employed. With respect to station N, the bridge 75 receives signals from the microphone N-25 over input N-76 and sends signals to the receiver N-26 at station N via output port N-77. The function of the bridge 75 is to detect, select, and route signals with speech activity to each of the stations, and terminate all other incoming signals. Therefore, if station N sends a signal to the bridge 75 via N-76, the bridge 75 will forward the signal to other stations 1,2, 3 . . . N-1 which are participating in the conference via their corresponding output port 1-77, 2-77, 3-77 . . . N-1-77.

Figure 4:
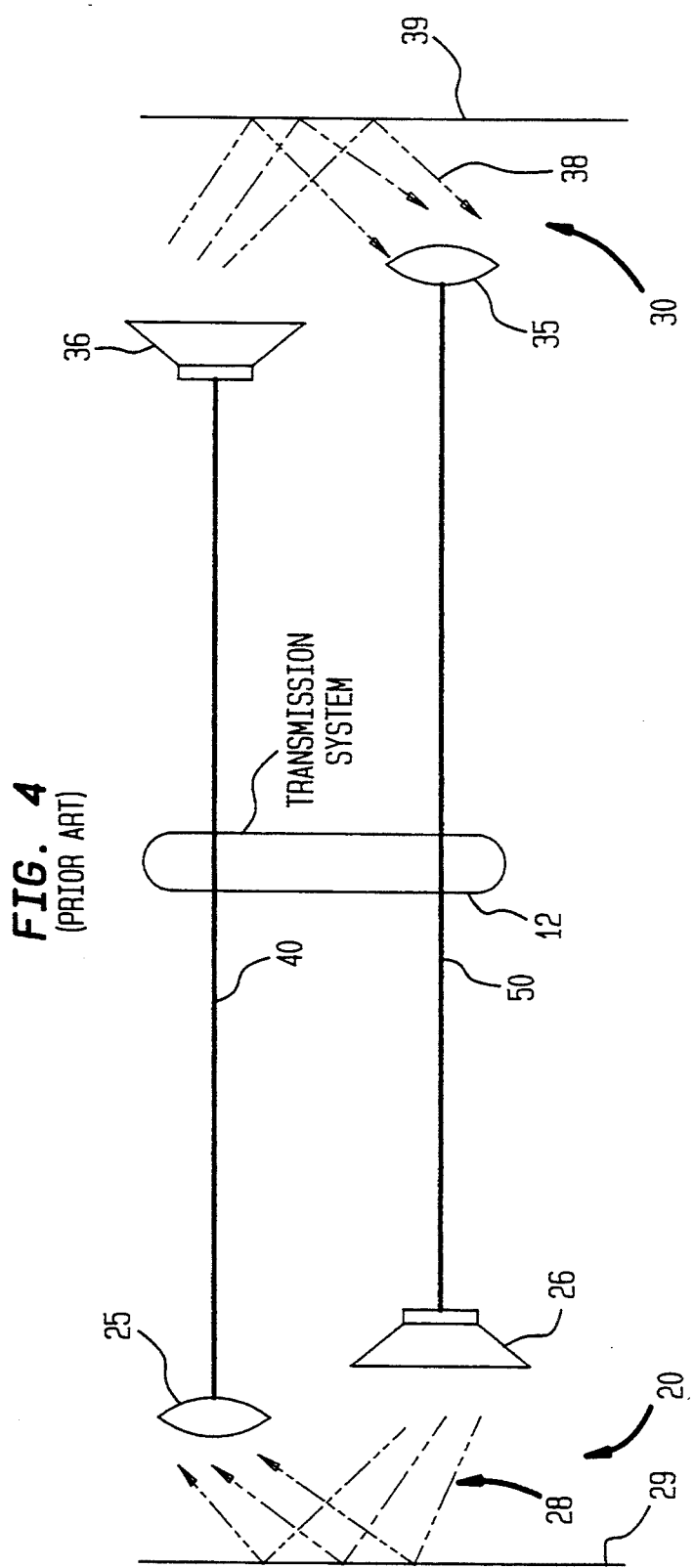
FIG. 4 illustrates the acoustic response function of a room in which a station of the teleconferencing system of FIG. 1 is located.

FIG. 4 schematically illustrates the acoustic feedback path which is incorporated in the point-to-point audio conferencing system 10 of FIG. 1. As indicated above in connection with FIG. 1, the station 20 includes the microphone 25 and the receiver 26. The microphone 25 and receiver 26 are arranged for hands-free use by a teleconference participant at the station 20. Because the station 20 is located in a room, there is acoustic coupling between the receiver 26 and the microphone 25. Such acoustic coupling is represented in FIG. 4 by the acoustic path 28 which illustratively includes reflections or reverberations off a wall 29. Similarly, at the station 30 there is acoustic coupling between the receiver 36 and microphone 35 via the path 38 which reflects off a wall 39. Similarly, there exists an acoustic feedback path between each pair of stations in the multipoint conferencing system.

Figure 5A:
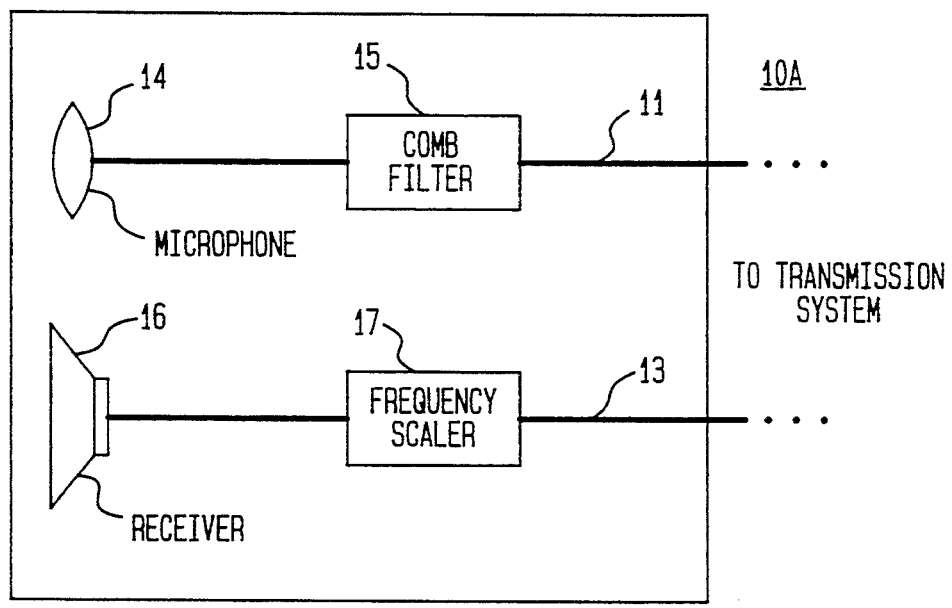
FIGS. 5A and 5B depict illustrative embodiments of a station of our audio processing system for teleconferencing systems comprising N stations for $N \geq 2$ in accordance with an aspect of our invention.
Figure 5B:
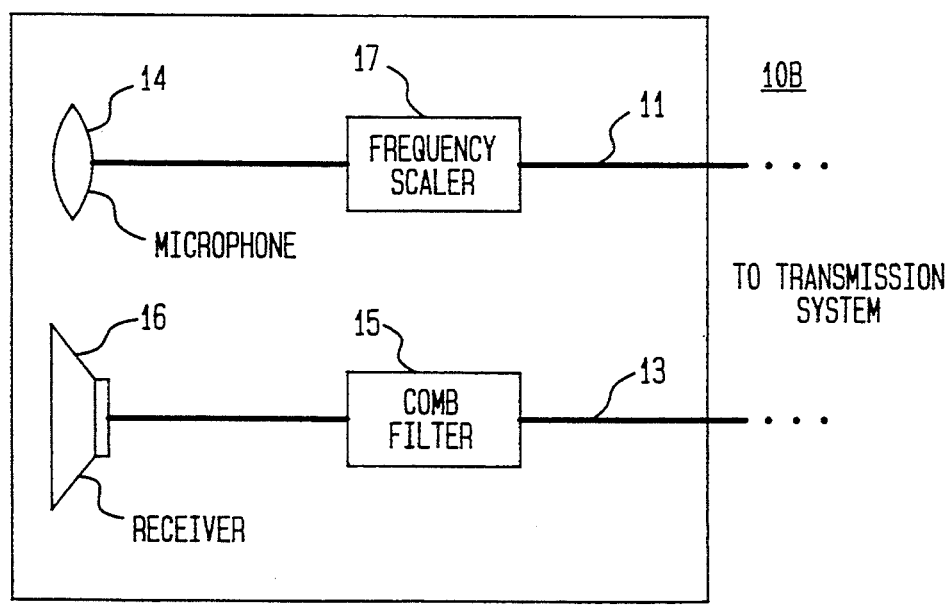
Figure 7A:
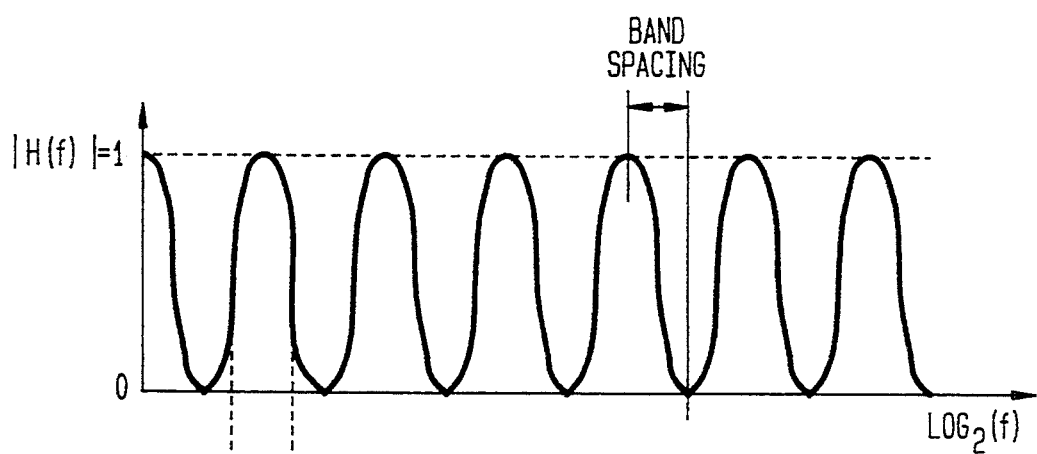
FIG. 7A shows the transfer function, H(f), of an illustrative comb filter for use in our audio processing system in accordance with an aspect of our invention.

In accordance with an aspect of our invention, FIGS. 5A and 5B depict illustrative embodiments of a station of our audio processing system for teleconferencing systems comprising N stations for N>2. The station 10A, which is representative of other stations in the audio processing system is shown in FIG. 5A and comprises a microphone 14, a receiver 16, a comb filter 15 and a frequency scaler 17. Illustratively, the microphone 14 is connected to comb filter 15 via a first channel 11, and the receiver 16 is connected to the frequency scaler 17 via a second channel 13. Alternatively, in another embodiment (shown in FIG. 5B), the microphone 14 could be connected to a frequency scaler 17 via the first channel 11, and the receiver 16 could be connected to the comb filter 15 via the second channel 13. The transfer function, H(f), of the comb filter comprises pass bands and stop bands, as shown in FIG. 7A. The comb filter and frequency scaler at each station have a special relationship in that the frequency scaler induces a shift in frequency of incoming signals corresponding to the peak-to-trough spacing of the transfer function of the comb filter.

Figure 6:
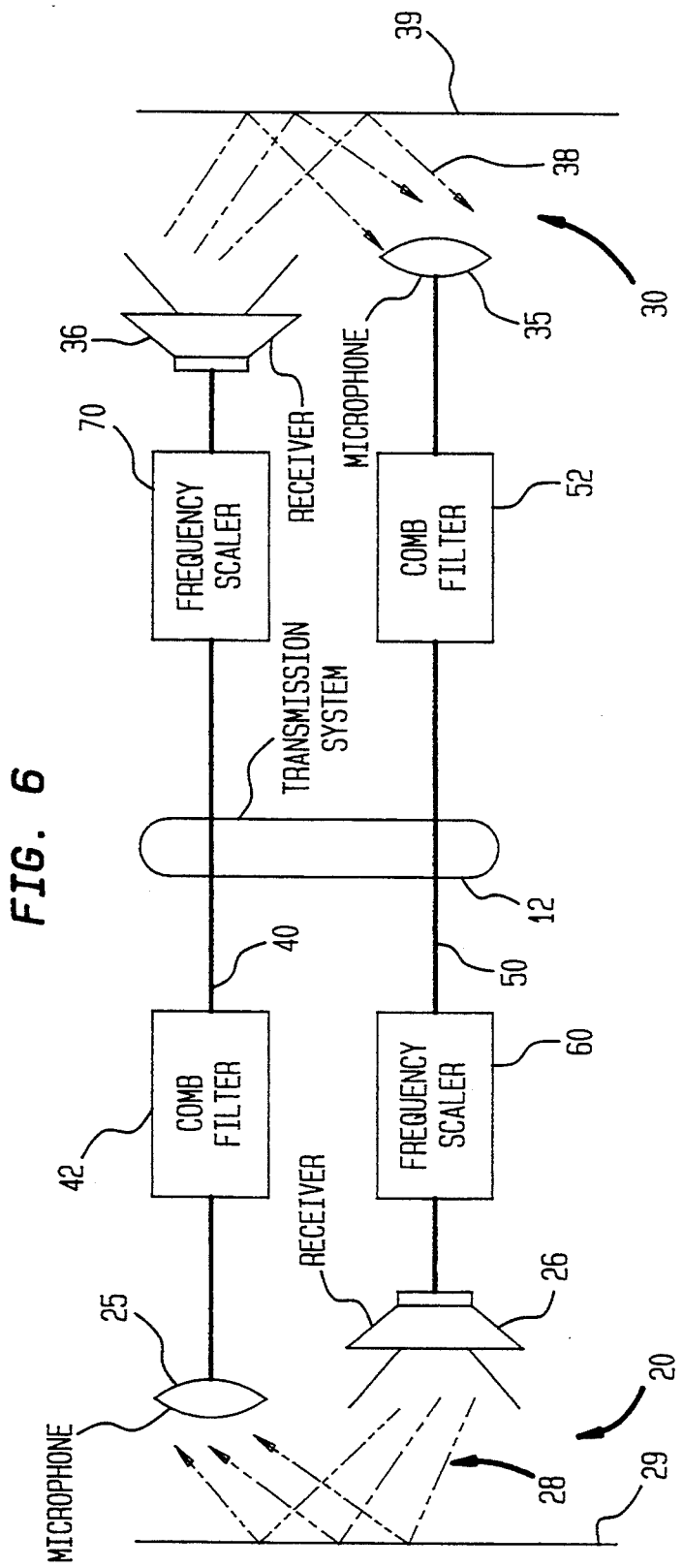
FIG. 6 shows an illustrative embodiment of a point-to-point audio processing system in accordance with an aspect of our invention.

In accordance with an aspect of our invention, FIG. 6 depicts a point-to-point audio processing system (N=2) for mitigating the effects of acoustic instability and echo. As shown in FIG. 6, the microphone 25 at the station 20 is connected to the receiver 36 at the station 30 by the channel 40 which goes through the transmission system 12. Similarly, the microphone 35 at the station 30 is connected to the receiver 26 at the station 20 by the channel 50, which also goes through the transmission system 12.

The channel 40 includes the comb filter 42. For illustrative purposes, the comb filter 42 is located at station 20 between microphone 25 and transmission system 12. The channel 50 includes the comb filter 52. Illustratively, the comb filter 52 is shown in FIG. 6 to be located in channel 50 in association with the station 30 at the output of the microphone 35. A frequency scaler 60 is illustratively shown in FIG. 6 to be located in channel 50 in association with station 20 between receiver 26 and transmission 12, and frequency scaler 70 is located in channel 40 in association with station 30 between receiver 36 and transmission system 12.

Alternatively, as demonstrated in FIG. 5B, the comb filter 42 of FIG. 6 may be associated with station 30 and located between receiver 36 and transmission system 12 in the channel 40, and comb filter 52 could be associated with station 20 and located between the transmission system 12 and the receiver 26. Accordingly, in this embodiment, frequency scaler 60 would be located in channel 50 in association with station 30 between microphone 35 and transmission 12, and frequency scaler 70 would be located in channel 40 in association with station 20 between microphone 25 and transmission system 12.

In prior audio conferencing systems, complementary comb filters and a single frequency scaler in either channel are utilized to increase the margin of acoustic instability and reduce acoustic echo. However, a drawback of this arrangement is that prior to entering a teleconferencing session, stations 20 and 30 must negotiate to ensure that channels 40 and 50 established between stations will each contain a complementary comb filter, and that proper frequency scaling is provided between the two channels. Furthermore, some teleconferencing stations must make equipment changes to configure the channels as described above.

A significant advantage of our audio processing system shown in FIG. 6 is that the need for negotiation and equipment changes prior to a conferencing session is obviated since the comb filter at one station is substantially the same as the comb filter at the other station. In addition, unlike prior processing systems, our system employs a frequency scaler in each channel, and the frequency scaler at one channel is substantially the same as the frequency scaler in the other channel.

Importantly, our arrangement increases the margin of acoustic stability and reduces acoustic echo by using comb filters and frequency scalers which cooperate with one another. Specifically, the frequency scaler induces a shift in frequency in incoming signals which shift corresponds to the peak-to-trough spacing of the transfer function of the comb filters. Therefore, a signal which has been filtered at a first comb filter is shifted in frequency at the frequency scaler such that the peaks of the shifted signal are aligned with the stop bands of a second comb filter, and the signal is substantially attenuated.

To better understand the cooperation between our comb filters and frequency scalers which cooperation mitigates effects of acoustic instability and echo, consider the acoustic feed back loop in FIG. 6. Consider speech which originates at the station 20. This speech is converted from acoustic form to an electronic audio signal by the microphone 25. The audio signal is then transmitted via the channel 40 to the receiver 36 at the station 30, where the audio signal is converted back onto acoustic form. The speech in acoustic form is then coupled via the acoustic paths 38 to microphone 35 where it is converted back into an electronic audio signal and transmitted via the channel 50 to the receiver 26 at the station 2{}. The receiver 26 converts the electronic audio signal back into acoustic form and the speech is transmitted via the acoustic paths 28 back to the microphone 25.

If the roundtrip gain of the loop is greater than unity, acoustic instability results. Even if the roundtrip gain is less than unity, the receiver at the station 20 may hear an echo at the station 20. The greater the audio processing delays, the more distinguishable is the echo for the receiver at the station 20. To provide a margin of acoustic stability and to suppress the acoustic echo, the channel 40 includes the comb filter 42 and frequency scaler 70 and the channel 50 includes the comb filter 52 and frequency scaler 60.

The transfer function H(f) of the comb filters 42 and 52 is illustrated in FIG. 7A. The transfer function H(f) comprises alternating pass bands and stop bands. The maximum depth of the nulls in the transfer functions is infinite, but the transitions are sinusoidal. Band transitions which are too sharp introduce noticeable impairment in the quality of transmitted speech. The transfer function extends over a frequency range on the order of 8 kHz and the band spacing (i.e., peak-to-trough spacing) in the transfer function is one-third of an octave.

Figure 7B:
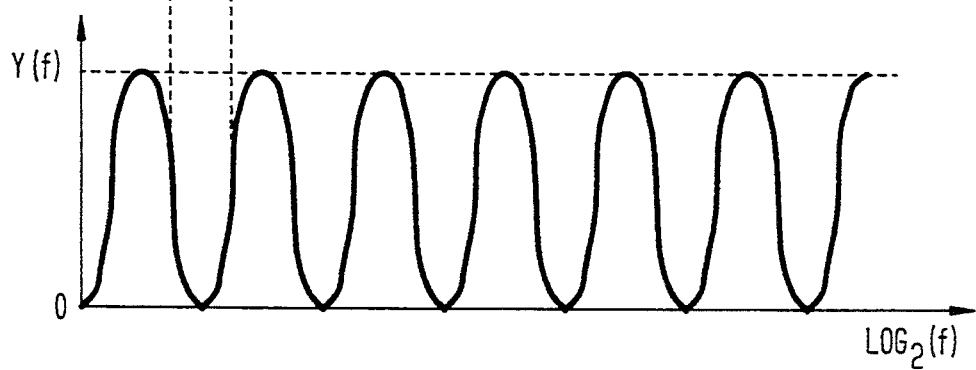
FIG. 7B illustratively depicts a signal, Y(f), which has been filtered by a comb filter having a transfer function, H(f), as shown in FIG. 7A, and shifted in frequency by the band spacing of the comb filter.

The frequency scalers of our invention are substantially the same and introduce shifts in frequency of substantially the same magnitude. The peak-to-trough spacing of the comb filters and the shift of the frequency scaler are chosen such that components of the signal passing through the pass bands a first comb filter and shifted in frequency by the frequency scaler fall into the stop bands of a second comb filter. FIG. 7B illustratively depicts a signal Y(f) which has been filtered by a comb filter with transfer function, H(f), shown in FIG. 7A and shifted in frequency by one band spacing of the comb filter.

Assume, for illustrative purposes, that the transfer function of the comb filters is characterized by the expression of Eq. 1, $$H(f) = \frac{1 + \cos(\alpha \pi \log(f))}{2} \quad (1)$$

wherein at any particular frequency the band spacing of the comb filters is determined by the constant $\alpha$. If frequency scalers introduce a shift of $-5\%$ and the constant in the above expression is $\alpha = 1/(\log 0.96)$, we can observe the following: a signal component at 471 Hz will fall into the center of a pass band of the first comb filter and the signal component is then shifted downward by 5% to 447.5 Hz, which coincides with the center of the stop band which is left-adjacent to the pass band centered at 471 Hz. Therefore, upon the shifted component encounting a second comb filter, it will be substantially attenuated.

Since a large shift in frequency in a signal could appreciably affect the speech quality of the signal, and the voice of a speaker, subjective listening tests indicated that a maximum shift of approximately 5% should be employed. A 5% shift in frequency corresponds to a band spacing at the comb filters of approximately 13.5 bands per octave.

To simplify the filter design further, the stop bands could be introduced into the spectrum only above approximately 300 Hz. Since echo suppression at frequencies below 300 Hz is not as essential, this will result in better sound quality as well. Feedback stability is still ensured since the frequency scaling is performed on the entire audio spectrum from 50 Hz to 7 kHz.

One of the benefits of using the comb filters in cooperation with frequency scalers in accordance with our invention is the improved acoustic stability. Specifically, the attenuation introduced in the speech signal after passing through the two substantially similar filters and a cooperating frequency scaler varies between infinity and 12 dB. The highest points, $-12$ dB, occur where the spectra of a first comb filter shifted by a frequency scaler and the spectra of a second comb filter intersect. Therefore, the worst case acoustic stability improvement due to our filters is 12 dB. Another benefit of our combination of comb filters and frequency scalers is reduced acoustic echo. This can be quantified at approximately 12 dB as perceived by the teleconferencing participant.

The comb filters 42 and 52 in cooperation with frequency scalers 60 and 70 mitigate the effects of acoustic coupling between the receiver and the microphone at each station. As indicated above, the reason is that any signal going around the feedback loop is processed by one of the comb filters, then by one of the frequency scalers, and then the other comb filter, and thus will be attenuated across its entire spectrum as the passband of one comb filter shifted by the frequency scaler is substantially complementary to the stopband of the other comb filter. For the same reason, echoes transmitted back to the near-end station resulting from acoustic coupling between the receiver and microphone at the far-end station are also reduced. On the other hand, a signal which travels from the microphone at one station to the receiver at the other station is processed by only one comb filter and one frequency scaler so that it is not attenuated across its entire spectrum.

Figure 8A:
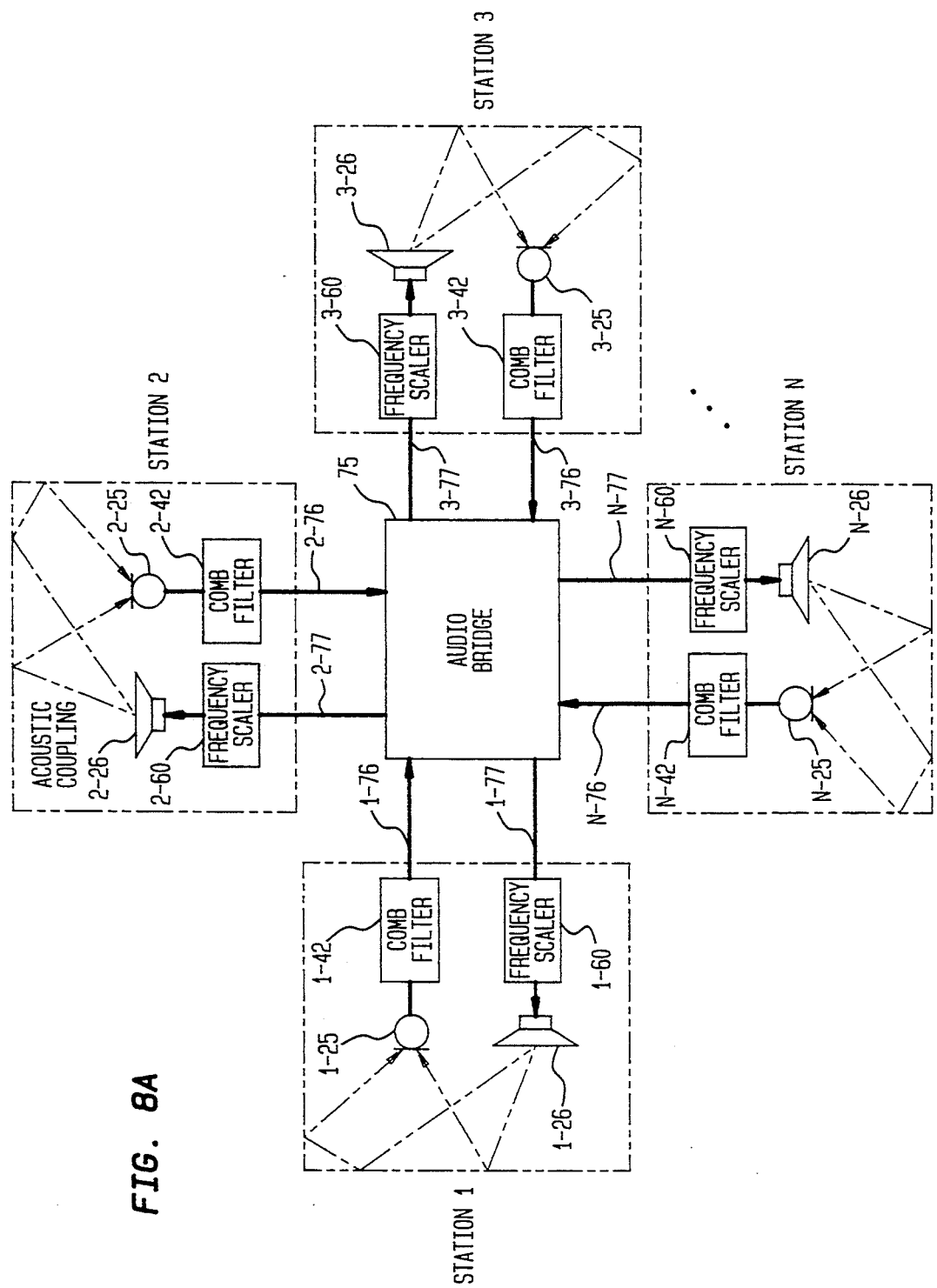
FIGS. 8A and 8B show illustrative embodiments of a multipoint audio processing system in accordance with an aspect of our invention.
Figure 8B:
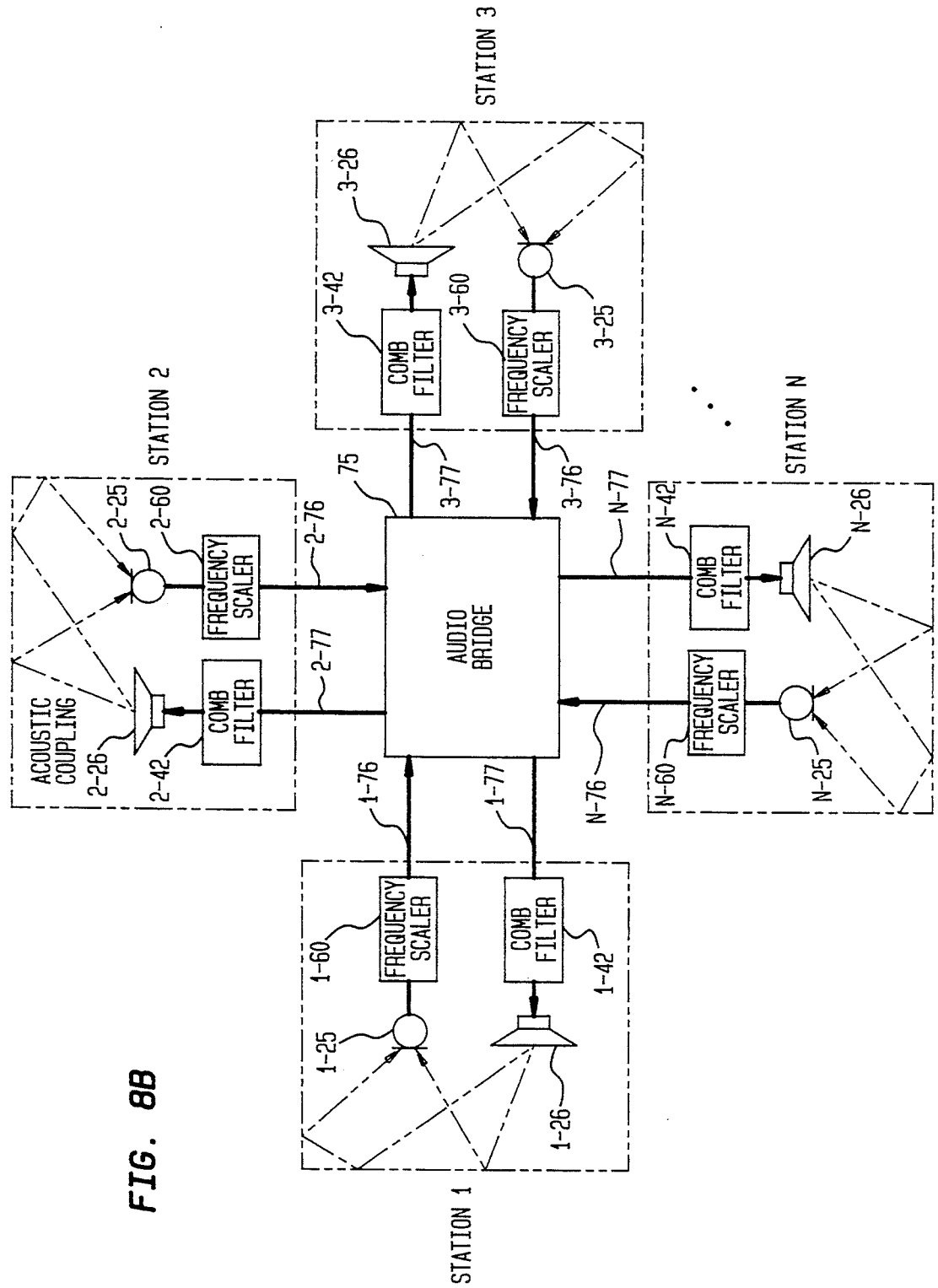

In accordance with another illustrative embodiment of our invention, FIGS. 8A and 8B depict illustrative embodiments of a multipoint audio processing system comprising N stations for $N \geq 2$. FIG. 8A shows an audio processing system which includes comb filters and frequency scalers in accordance with our invention. Specifically, as illustratively shown in FIG. 8A, each station 1, 2, 3 . . . N includes a comb filter and a frequency scaler. Specifically, station N includes a comb filter N-42 located between microphone N-25 and input port N-76 of audio bridge 75 and a frequency scaler N-60) located between receiver N-26 and output port N-77 of audio bridge 75. All comb filters 1-26, 2-26, 3-26 . . . N-26 are substantially the same having substantially the same transfer function of alternating pass bands and stop bands. Furthermore, all frequency scalers 1-60, 2-60, 3-60 . . . N-60 are substantially the same having substantially the same transfer function of alternating pass bands and stop bands. Furthermore, as discussed above the comb filters and frequency scalers cooperate with one another such that the frequency scalers induce a shift in frequency corresponding to the peak-to-trough spacing of the transfer function the comb filters. The effects of acoustic stability and echo are mitigated as described above for point-to-point audio processing systems. Alternatively, as discussed above and shown in FIG. 8B, the location of the frequency scaler and comb filter at each station could be reversed.

A significant advantage our invention is that comb filters can be utilized in multipoint systems to mitigate the effects of acoustic instability and echo between any pair of stations in the multipoint system. Another significant advantage of our invention is that, as with point-to-point systems, it is not necessary for stations to negotiate which comb filter should be utilized at each station and which channel will contain the frequency scaler since the comb filter and frequency scaler at all stations are substantially the same. Therefore, system complexity and conference set-up time are reduced.

Figure 9:
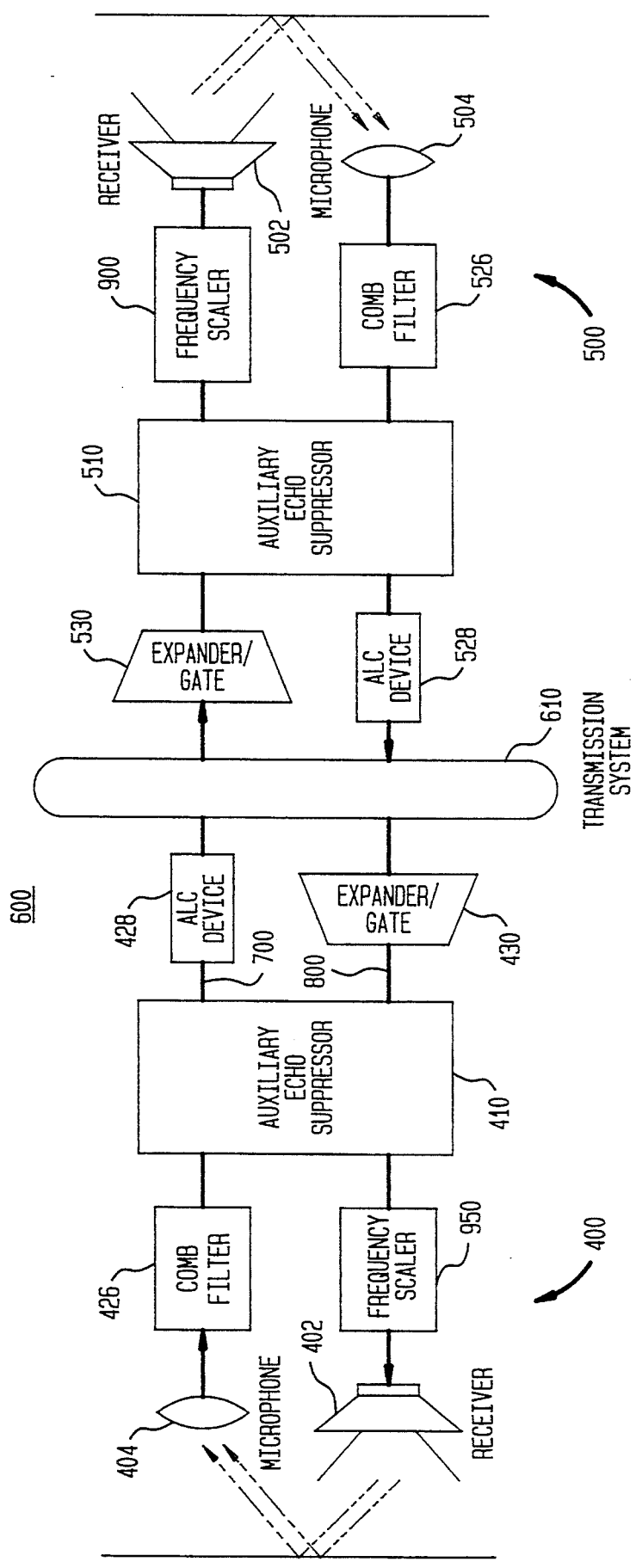
FIG. 9 shows an illustrative embodiment of an audio processing system comprising comb filters, frequency scalers, and auxiliary echo suppressors which system reduces acoustic echo and increases the margin of acoustic stability in teleconferencing systems having high or low transmission delay in accordance with an aspect of our invention.

Another alternative embodiment of an audio processing system is depicted in FIG. 9 and utilizes comb filters with sinusoidal band transitions and frequency scalers in combination with auxiliary echo suppressors. This illustrative embodiment of an audio processing system reduces acoustic echo and increases the margin of acoustic stability in teleconferencing systems having low or high transmission delays. This capability makes the system versatile enough to be used in virtually any point-to-point or multipoint conferencing system. Specifically, FIG. 9 depicts a microphone 404 at a station 400 connected to a receiver 502 at a station 500 by a channel 700 which passes through a transmission system 610. Similarly, a microphone 504 at a station 500 is connected to a receiver 402 at a station 400 by a channel 800, which also passes through transmission system 610.

The audio processing system of FIG. 9 also includes frequency scalers 900 and 950 associated with receivers 502 and 402, respectively, as discussed above and shown in FIG. 6, respectively. FIG. 9 also includes other devices for reducing noise and smoothing out the operation of the individual components. Below, a description of the function of each component in the context of the overall arrangement is provided. The arrangement and operation of components at each station illustratively depicted in FIG. 9 are also representative of the arrangement and operation of components at each station in a multipoint audio processing system wherein channels are similarly formed between any pair of stations interconnected via an audio bridge.

Figure 10:
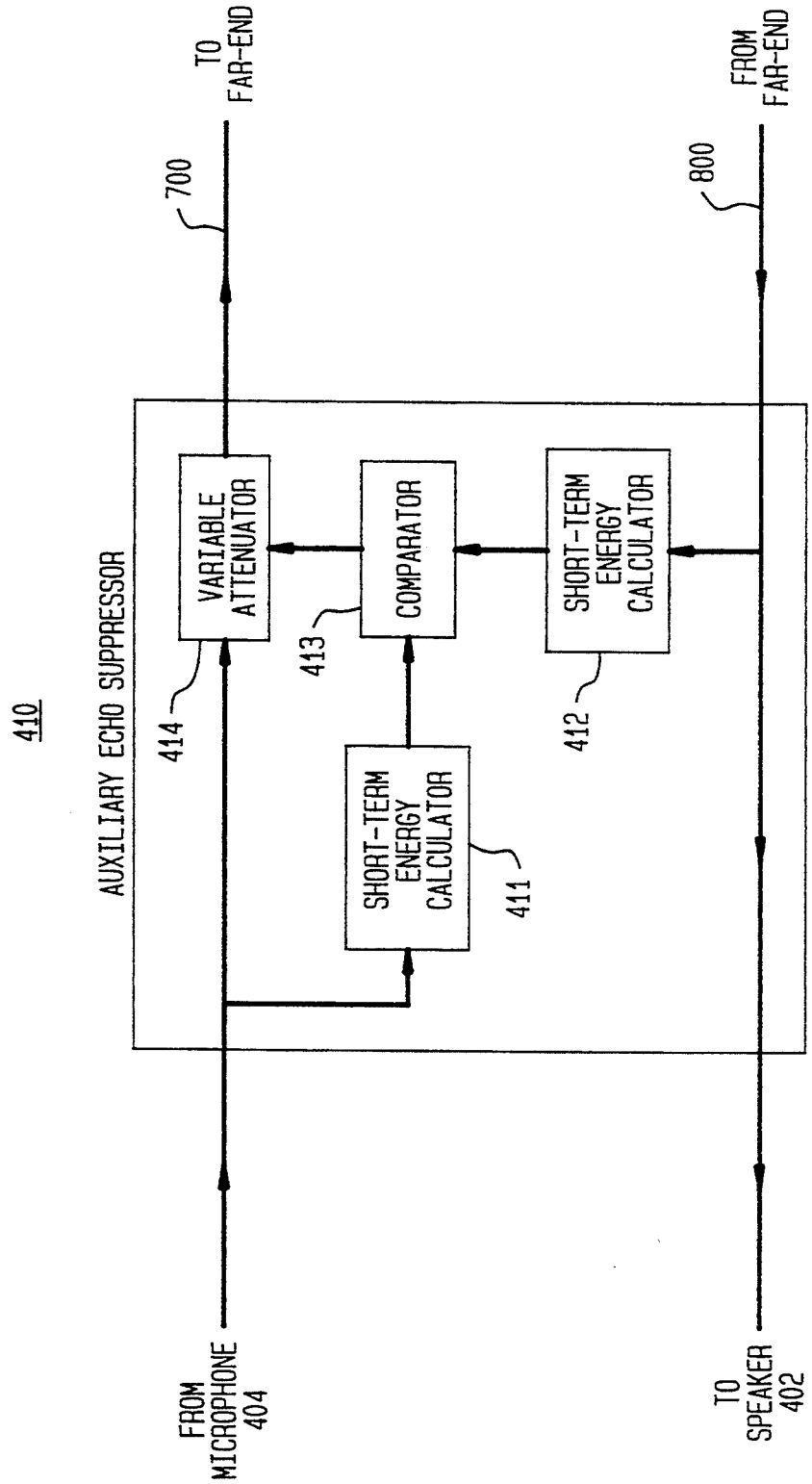
FIG. 10 shows an illustrative embodiment of an auxiliary echo suppressor in accordance with an aspect of our invention.

A block diagram of an illustrative embodiment of the auxiliary echo suppressor 410 is shown in FIG. 10. As shown in FIG. 10, the signal from microphone 404 on channel 700 enters the auxiliary echo suppressor 410, and a portion of the signal is directed to the short-energy calculator 411 which determines the energy level of the signal from the microphone ($E_{local}$). A signal from the far-end directed towards receiver 402 on channel 800 also enters the auxiliary echo suppressor 410, and a portion of the signal is directed toward another short-energy calculator 412 which determines the energy level of the signal from the far end ($E_{far-end}$). A comparator 413 compares the strength of the $E_{local}$ signal to that of the $E_{far-end}$ signal, and the result of this comparison is input to a variable attenuator 414 to control the level of attenuation being inserted in channel 700. The auxiliary echo suppressor 510 at station 500 functions similarly to that depicted in FIG. 10 to insert an attenuation in channel 800 based upon a comparison of the energy level of the signal output from microphone 504 and the energy level of the signal directed towards receiver 502.

Figure 11:
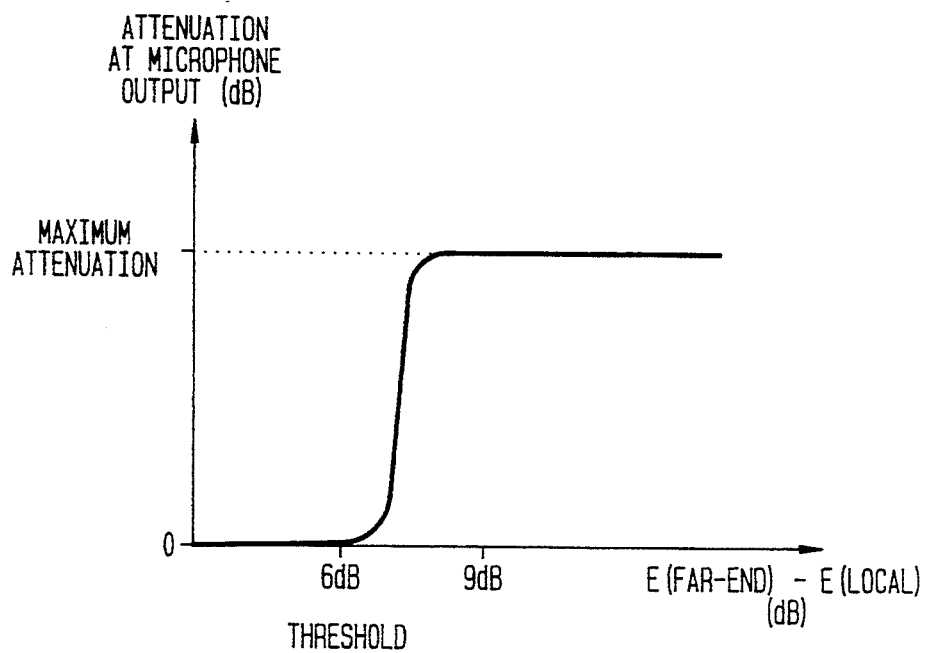
FIG. 11 depicts a plot of the attenuation inserted by the auxiliary echo suppressor in accordance with an aspect of our invention.

The operation principle of the auxiliary echo suppressor 410, 510 is illustrated in FIG. 11 which shows a plot of the attenuation inserted on a channel at a microphone output. With reference to FIG. 11, the attenuation inserted by the auxiliary echo suppressor 410 at station 400 is described as follows. The level of attenuation inserted is a function of the difference between the energy level of the signal received at receiver 402 at station 400 from the far end ($E_{far-end}$) and the energy level of the signal output from the microphone 404 at station 400 ($E_{local}$).

The plot in FIG. 11 shows that when the two signals are of comparable strength, no attenuation is inserted because, under such conditions, any echo will be effectively masked by the local speech which is assumed to be present in this case. However, when the signal received from the far end, $E_{far-end}$, is stronger than the signal output from microphone 404, $E_{local}$, by some minimum pre-defined amount, no local speech is assumed present and, therefore, attenuation is introduced to suppress the echo. The auxiliary echo suppressor 510 at station 500 similarly introduces attenuation into channel 800 when the signal destined for receiver 502 is stronger than the signal received from the microphone 504 by a pre-defined minimum amount.

Typically, when an echo suppressor such as 410 and 510 is used alone to subjectively eliminate echoes, the pre-defined minimum difference is set at 6 dB. This difference is based on the average minimum echo return loss due to room acoustics and microphone/receiver placement. Thus, if the signal leaving the microphone is weaker than the signal entering the receiver by at least 6 dB, no local speech is assumed present, and maximum attenuation is introduced in the microphone signal path. However, local speech that is more 6 dB lower than the signal destined for the receiver will be suppressed as echo. Having such a low threshold (6 dB) imposes rather tight and unrealistic constraint on the dynamic range of the local speech, since no one sits exactly the same distance from the microphone or talks with the same loudness.

Between the microphone 402 and auxiliary echo suppression 410 at station 400, a comb filter 426 is located, and between the microphone 502 and auxiliary echo suppression 510 at station 500, a comb filter 526 is located. The comb filters 426 and 526 are substantially the same having substantially the same transfer function of alternating pass bands and stop bands. Frequency scaler 900 is located between receiver 502 and auxiliary echo suppression 410 at station 400 and frequency scaler 950 is located between receiver 402 and auxiliary echo suppression 510 at station 500. Placing the comb filters 426 and 526 and frequency scalers 900 and 950 as such in channels 700 and 800, respectively, helps the auxiliary echo suppressors 410 and 510 more readily distinguish between the acoustically coupled far-end speech (echo) and the locally generated speech since the echo will have been processed by both comb filters and a frequency scaler, but the local speech will have been processed by only one of the two comb filters. Therefore, on average the difference between the echo and locally generated speech will be increased by approximately 12 dB its discussed previously. The 12 dB additional average separation between the echo and the local speech allows the threshold to be raised from 6 dB to 18 dB in the echo suppressor. The increased threshold greatly reduces the chance of local speech being mistaken for echo and therefore being unnecessarily attenuated at the auxiliary echo suppressors 410 and 510.

In this embodiment of the invention, both comb filters are active continuously regardless of whether there is a teleconference participant at only one station or at both stations. The continuous activity of the comb filters is possible as in the case of low transmission delays since the filters have smooth band transitions, and therefore the speech quality is relatively unaffected. As mentioned previously, we can relax the constraints on the comb filters since echo is masked by local speech when participants at both ends of the conference are talking (i.e., double talk), and since auxiliary echo suppressors remove any residual echo when only one end is generating speech.

Thus, our unique combination and arrangement of comb filters, frequency scalers, and auxiliary echo suppressors allow design constraints otherwise imposed to be greatly relaxed. The relaxation of such constraints results in significant improvements in the quality of audio conferencing regardless of the round-trip transmission delay of the teleconferencing system. Specifically, imperceptible acoustic echo, acoustically stable performance, full interactivity, and low speech signal distortion are achieved. Since the frequency scalers, comb filters, and echo suppressors as well as room acoustics treatments and microphone/receiver placement techniques could provide the necessary echo return loss enhancement and margin of acoustic stability, additional attenuation may not be required. Therefore, the fully-interactive nature of the system is preserved.

As shown in FIG. 9, signals exiting the auxiliary echo suppressors 410 and 510 on channels 700 and 800, respectively, are processed by automatic level controlling (ALC) devices 428 and 528, respectively, before entering transmission system 610. Illustratively, these devices 428, 528 can be implemented. The ALC devices 410 and 510, such as those described in U.S. Pat. No. 5,029,162, output all speech signals with roughly the same intensity regardless of the speaking style of the teleconference participant. Such control of the speech signal levels will ensure that signals entering the transmission system 610 and eventually the audio equipment at the far end are within the desired dynamic range. Therefore, a very strong speech signal due to a loud talker will not overload the codec (see FIG. 1) and any other equipment that succeeds it.

As shown in FIG. 9, as a signal exits the transmission system 610 on channel 700 destined for receiver 502 for reception, the signal is processed at an expander/gate 530 to reduce the ambient and transmission noise and to smooth out the operation of the echo suppressor. Similarly, a signal exiting the transmission system 610 on channel 800 destined for receiver 402 for reception, the signal is processed at an expander/gate 430. Therefore, signals transmitted from microphone 514 at station 500 through the transmission system 610 toward receiver 402 at station 400 are processed at expander/gate 430, and signals transmitted from microphone 404 at station 400 through the transmission system 610 toward receiver 502 at station 500 are processed at expander/gate 530. The expander/gates 430 and 530 are used to reduce the ambient and transmission noise contained in the signals. As the name of this device implies, the expander/gate increases the dynamic range of the input signal by a given multiple if its intensity falls below a predefined threshold.

For discussion purposes, an expander/gate having an expansion ratio of 3:1 and a threshold of 0 dBm is assumed. Under these assumptions, if the average level of the incoming signal is below the threshold, say at $-10$ dBm, the signal is assumed to contain noise and will be output at $-30$ dBm. On the contrary, if the incoming signal is near or above the threshold, say at 10 dBm, the signal is assumed to contain speech and is output at the same level (here, 10 dBm). The expander/gate threshold should be set such that when the incoming signal contains speech, it is near or above the threshold. But when no speech is present the incoming signal is below the threshold.

Figure 12:
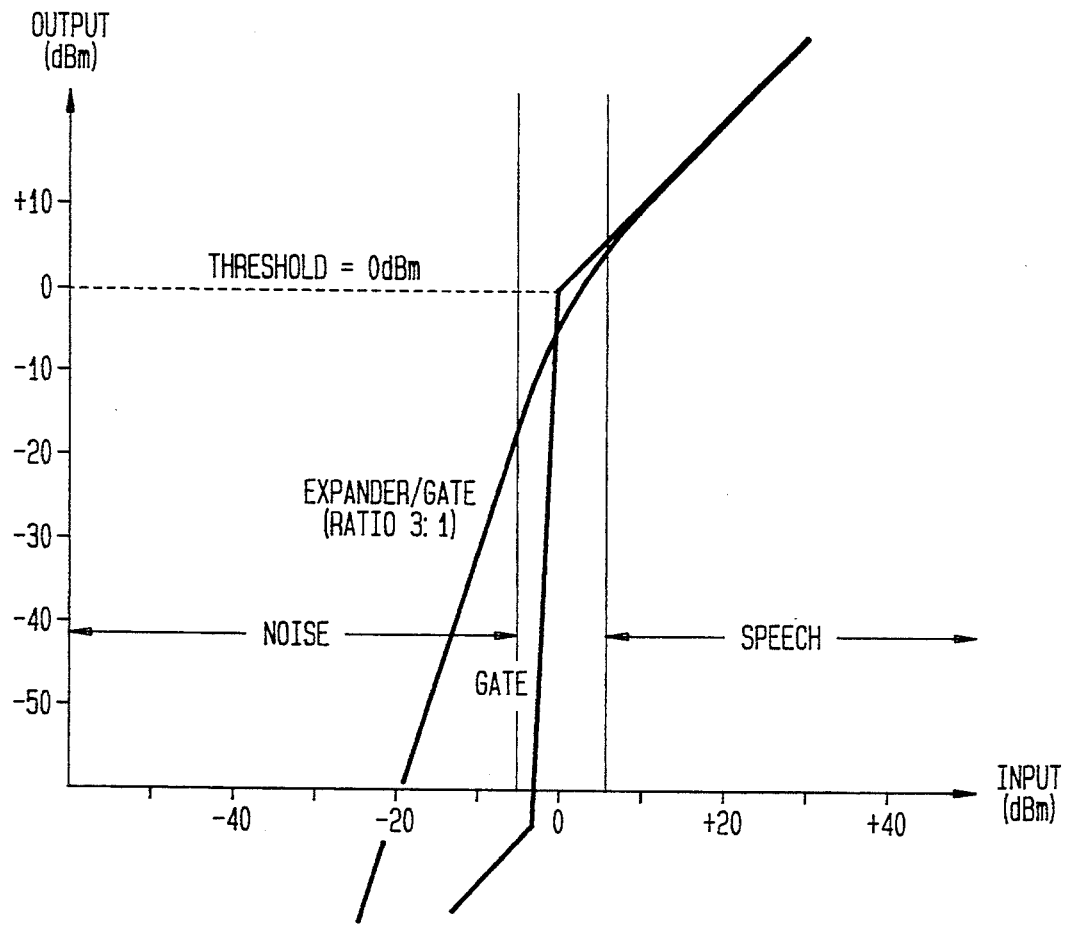
FIG. 12 illustrates typical response curves of the noise gate and expander/gate in accordance with an aspect of our invention.

A noise gate could be used instead of an expander/gate. One major difference between an expander/gate and a noise gate is that the latter has a response curve characterized by a hard knee at the threshold, while the former has a smooth knee curve that prevents the speech signal from being mutilated by the device even if the signal falls very near the threshold. FIG. 12 shows typical response curves of the noise gate and expander/gate.

CONCLUSION

An audio processing system for a teleconferencing system has been disclosed. The audio processing system includes substantially the same comb filter and frequency scaler at each station for reducing acoustic echo and increasing the margin of acoustic stability. The comb filters and frequency scalers cooperate with one another in that the frequency scaler induces a shift in frequency which corresponds to the band (peak-to-trough) spacing of the transfer function of the comb filters. Our audio processing system may also include auxiliary echo suppressors and other devices for reducing noise and smoothing out the operation of individual components in the system. Since the comb filter employed at each station are not complementary, but substantially the same, our audio processing system can mitigate the effects of acoustic instability and echo in point-to-point and multipoint audio processing systems. Furthermore, since each station utilizes substantially the same equipment, the need for equipment negotiation between stations and equipment changes prior to a conferencing session is obviated. Finally, the above-described embodiments of the invention are intended to be illustrative only. Numerous alternative embodiments may be devised by those skilled in the art without departing from the spirit and scope of the following claims.

What is claimed is:

1. An audio processing system for a teleconferencing system connecting N stations, for $N \geq 2$, comprising at each station:
   a microphone for transmitting signals to other stations;
   a receiver for receiving signals from other stations;
   a comb filter connected to said microphone having a transfer function of alternating pass bands and stop bands and a band spacing equal to the peak-to-trough spacing between adjacent pass bands and stop bands; and
   a frequency scaler connected to said receiver for inducing a shift in frequency in signals from other stations prior to being received at said receiver, wherein said frequency scaler induces a shift in frequency corresponding to said band spacing of said comb filter.

2. The audio processing system of claim 1 wherein said comb filter at each station to includes pass and stop bands which do not overlap in frequency with stop and pass bands, respectively, of comb filters at other stations.

3. The audio processing system of claim 1 wherein said comb filter at each station has substantially the same transfer function as comb filters at other stations.

4. The audio processing system of claim 3 wherein said frequency scaler at each station induces substantially the same shift in frequency as frequency scalers at other stations.

5. The audio processing system of claim 4 wherein signals transmitted by said microphone at each station which encounters said comb filter, a frequency scaler at one of the stations, and a comb filter at said one of the other stations, is substantially attenuated to increase the margin of acoustic stability and reduce acoustic echo.

6. An audio processing system for a point-to-point teleconferencing system, comprising:
   a first station including first microphone means and first speaker means,
   a second station remotely located from the first station and including second microphone means and second speaker means,
   a first audio channel connecting said first microphone means with said second speaker means and a second audio channel connecting said second microphone means with said first speaker means,
   first and second comb filters having substantially the same pass and stop bands located in said first and second channels, respectively, and
   first and second frequency scalers located in one of said channels opposite said first and second comb filters, respectively, for inducing a shift in frequency in signals in said one channel, wherein said first and second frequency scalers induce a shift in frequency corresponding to the peak-to-trough spacing between adjacent pass bands and stop bands of said first and second comb filters.

7. An audio processing system for a multipoint teleconferencing system, comprising:
   N stations, for N≧2, located remotely from one another; and
   an audio bridge connected to each of said N stations for establishing first and second channels between each pair of said N stations, each station in each said pair of stations including
   a microphone for transmitting signals to another station in said pair of stations,
   a receiver for receiving signals from another microphone at said other station via said first channel, said microphone transmitting signals to another receiver at said other station via said second channel,
   a comb filter in one of said channels having a transfer function of alternating pass bands and stop bands and a band spacing equal to the peak-to-trough spacing between adjacent pass bands and stop bands, and
   a frequency scaler in the other of said channels for inducing a shift in frequency in signals from said other station of said pair of stations, wherein said frequency scaler induces a shift in frequency corresponding to said band spacing of said comb filter.

8. The audio processing system of claim 7 wherein said comb filters at said N stations have substantially the same transfer function and said frequency scalers at said N stations induce substantially the same shift in frequency.

9. The audio processing system of claim 8 wherein, at each station, said frequency scaler is located between said receiver and said audio bridge in said first channel and said comb filter is located between said microphone and said audio bridge in said second channel.

10. The audio processing system of claim 8 wherein, at each of said N stations, said frequency scaler is located between said microphone and said audio bridge in said second channel and said comb filter is located between said receiver and said audio bridge in said first channel.

11. The audio processing system of claim 7 wherein said frequency shifter at each said station induces up to a 5% downward shift in frequency.

12. An audio processing system for teleconferencing systems having high and low transmission delays, comprising:
   a plurality of stations located remotely from one another; and
   a transmission system for connecting each of said stations to each of the other stations, wherein each pair of said plurality of stations have a first station and a second station connected via a first channel and a second channel,
   at said first station, first microphone means for transmitting a first signal having an intensity, and first receiver means for receiving a second signal having an intensity,
   at said second station, second microphone means for transmitting said second signal to said first receiver means and second receiver means for receiving said first signal from said first microphone means, wherein said first channel connects said first microphone means with said second receiver means through said transmission system and said second channel connects said second microphone means with said first receiver means through said transmission system;
   at said first station, first echo suppressor means connected to said first microphone means for inserting a first variable attenuation in said first channel at the output of said first microphone, the first variable attenuation depending upon the intensity of said first signal transmitted from said first microphone means and the intensity of said second signal being received by said first receiver;
   at said second station, second echo suppressor means connected to said second microphone means for inserting a variable attenuation in said second channel at the output of said second microphone depending upon the intensity of said second signal transmitted from said second microphone means and the intensity of said first signal being received by said second receiver;
   at said first and second stations, first and second comb filters, respectively, having substantially the same pass and stop bands located in said first and second channels, respectively, said first comb filter being located between said first microphone means and said first echo suppressor means and said second comb filter being located between said second microphone means and said echo suppressor means; and
   at said first and second stations, first and second frequency scalers, respectively, located in said second and first channels, respectively, said first frequency scaler being located between said first receiver and said first echo suppressor means and said second frequency scaler being located between said second receiver and said second echo suppressor, wherein said first and second frequency scalers induce a shift in frequency corresponding to the peak-to-trough spacing between adjacent pass and stop bands of said first and second comb filters.

13. The audio processing system of claim 12 wherein said first echo suppressor means comprises means for comparing the intensity of said first signal transmitted from said first microphone means and the intensity of said second signal being received by said first receiver and said second echo suppressor means comprises means for comparing the intensity of said second signal transmitted from said second microphone means and the intensity of said first signal being received by said second receiver, said comparing means producing an input signal for determining the variable attenuation to be inserted.

14. The audio processing system of claim 13 further comprising first and second expander/gates for reducing ambient and transmission noise and increasing the dynamic range of said first and second signals by a pre-defined multiple if the intensity of said first and second signals, respectively, is below a pre-defined threshold, said first expander/gate being located between said first echo suppressor means and said transmission system in said second channel, and said second expander/gate being located between said second echo suppressor means and said transmission system in said first channel.

15. The audio processing system of claim 14 further comprising first and second automatic level control devices, for controlling the intensity of said first and second signals on said first and second channels, respectively, said first device being located between said first echo suppressor means and said transmission system in said first channel and said second device being located between said second echo suppressor means and said transmission system in said first channel.

* * * * *